US012571487B1

(12) United States Patent
Gramlich et al.

(10) Patent No.: US 12,571,487 B1
(45) Date of Patent: Mar. 10, 2026

(54) GATE VALVE POSITION INDICATORS

(71) Applicant: Bestway Oilfield, Inc., Channelview, TX (US)

(72) Inventors: Don Channing Gramlich, Richmond, TX (US); Mehul Jain, Humble, TX (US); Brad Fenn, Spring, TX (US)

(73) Assignee: Bestway Oilfield, Inc., Channelview, TX (US)

( * ) Notice: Subject to any disclaimer, the term of this patent is extended or adjusted under 35 U.S.C. 154(b) by 0 days.

(21) Appl. No.: 19/180,832

(22) Filed: Apr. 16, 2025

Related U.S. Application Data

(60) Provisional application No. 63/692,147, filed on Sep. 8, 2024.

(51) Int. Cl.
    F16K 37/00       (2006.01)
    F16K 3/30        (2006.01)
(52) U.S. Cl.
    CPC ............ F16K 37/0041 (2013.01); F16K 3/30 (2013.01); F16K 37/0025 (2013.01); F16K 37/0058 (2013.01)
(58) Field of Classification Search
    CPC ..... F16K 37/0041; F16K 3/30; F16K 37/0058
    See application file for complete search history.

(56) References Cited

U.S. PATENT DOCUMENTS 3,001,183 A * 9/1961 Mckenney .......... G01D 5/2013
                                              324/207.16
3,541,430 A * 11/1970 Luger .................... G01R 1/203
                                              333/81 R 4,926,903 A    5/1990 Kawai
6,257,276 B1 * 7/2001 Muller ................ F16K 37/0041
                                              137/554
6,975,103 B1 * 12/2005 Blom ..................... G01R 27/14
                                              324/99 D
9,347,289 B2 * 5/2016 Judge .................... E21B 33/063
2016/0040802 A1    2/2016 Clark et al.
2018/0283138 A1 * 10/2018 Peyregne ............... E21B 34/16
2020/0355321 A1    11/2020 Zerkus et al.
2024/0077147 A1    3/2024 Duncan et al.

FOREIGN PATENT DOCUMENTS

CN            203670846 U      6/2014

OTHER PUBLICATIONS

International Search Report and Written Opinion received in Patent Cooperation Treaty Application No. PCT/US2025/024979, dated Aug. 6, 2025, 12 pages.

* cited by examiner

*Primary Examiner* — Angelisa L. Hicks
(74) *Attorney, Agent, or Firm* — Johnston IP Law, PLLC

(57)            ABSTRACT

A gate valve includes a valve body having a through-bore and a gate cavity that intersect and are substantially orthogonal to each other; a gate disposed within the gate cavity that is operable to move between an open position and a closed position; a balance rod that is coupled to the gate and at least partially disposed within the gate cavity; and a potentiometer coupled to the balance rod for determining a position of the gate. The potentiometer may be used to indicate the position of the gate within the gate cavity by correlating the resistance of the potentiometer with the position of the gate within the gate cavity. The valve may further include a viewing aperture formed through a balance rod housing coupled to the valve body for visually determining the position of the balance rod, and therefore, determining position of the gate within the gate cavity.

5 Claims, 6 Drawing Sheets

244

GATE VALVE POSITION INDICATORS

RELATED APPLICATION

This application claims the benefit of U.S. Provisional Patent Application 63/692,147 filed by Don Channing Gramlich on Sep. 8, 2024, entitled "Gate Valve Position Indicators," which is incorporated herein by reference for all purposes.

TECHNICAL FIELD

This application is directed, in general, to valves for use in fluid transfer applications, and more specifically to gate valve position indicators, which may be used in oil and gas applications.

BACKGROUND

The following discussion of the background is intended to facilitate an understanding of the present disclosure only. It should be appreciated that the discussion is not an acknowledgement or admission that any of the material referred to was part of the common general knowledge at the priority date of the application.

Gate valves are used to control the transfer of fluids in tubing and pipelines. Specifically, gate valves are used to stop and start the flow of fluids in a downstream or upstream direction. Gate valves are commonly used in the oil and gas industry to control the flow of various fluids such as production fluids, water, fracking fluids, and other fluids used in drilling, operating, and maintaining oil and gas wells.

Gate valves generally operate by actuation of an internal gate, which in one position has an opening to allow upstream fluids to flow through the valve and in a downstream direction and a second position which blocks flow through the valve thereby preventing transfer of fluid in a downstream direction. While gate valves have been in existence for a long time, improvements are still desired.

SUMMARY

According to an illustrative embodiment a gate valve includes a valve body; a gate disposed within the gate cavity; a balance rod having a first end and a second end; and a potentiometer coupled to the second end of the balance rod for determining a position of the gate. The valve body is formed with a through-bore therethrough and a gate cavity. The through-bore and the gate cavity intersect and are substantially orthogonal to each other. The gate is operable to translate along a length of the gate cavity to move between an open position and a closed position. When the gate is in the closed position the gate substantially blocks fluid flow through the through-bore and when the gate is in the open position the gate does not substantially block fluid flow through the through-bore. The first end of the balance rod is coupled to the gate. The balance rod is at least partially disposed within the gate cavity.

According to an illustrative embodiment gate valve includes a valve body; a gate disposed within the gate cavity; a balance rod having a first end and a second end; and a balance rod housing coupled to the valve body. The valve body is formed with a through-bore therethrough and a gate cavity. The through-bore and the gate cavity intersect and are substantially orthogonal to each other. The gate is operable to translate along a length of the gate cavity to move between an open position and a closed position. The gate is in the closed position the gate substantially blocks fluid flow through the through-bore and when the gate is in the open position the gate does not substantially block fluid flow through the through-bore. The first end of the balance rod is coupled to the gate. The balance rod is at least partially disposed within the gate cavity. The balance rod is partially disposed within the balance rod housing. A viewing aperture is formed within the balance rod housing for viewing a position of the balance rod within the balance rod housing.

According to an illustrative embodiment a method of indicating the position of a gate of a gate valve includes the step of applying an electrical current to a first terminal of a potentiometer, wherein the electrical current has a first voltage; receiving the electrical current from a second terminal of a potentiometer, wherein the electrical current has a second voltage; determining the difference between the first voltage and the second voltage using an ohmmeter; and correlating the difference between the first voltage and the second voltage with a position of a slab gate within a gate valve. The potentiometer is coupled to a valve body of the gate valve. A slider rod of the potentiometer is coupled to a balance rod of the gate valve. The balance rod of the gate valve is coupled to the slab gate.

Other embodiments are disclosed.

DESCRIPTION OF THE DRAWINGS

Illustrative embodiments of the present disclosure are described in detail below with reference to the attached drawing figures, which are incorporated by reference herein and wherein.

DETAILED DESCRIPTION

Figure 1:
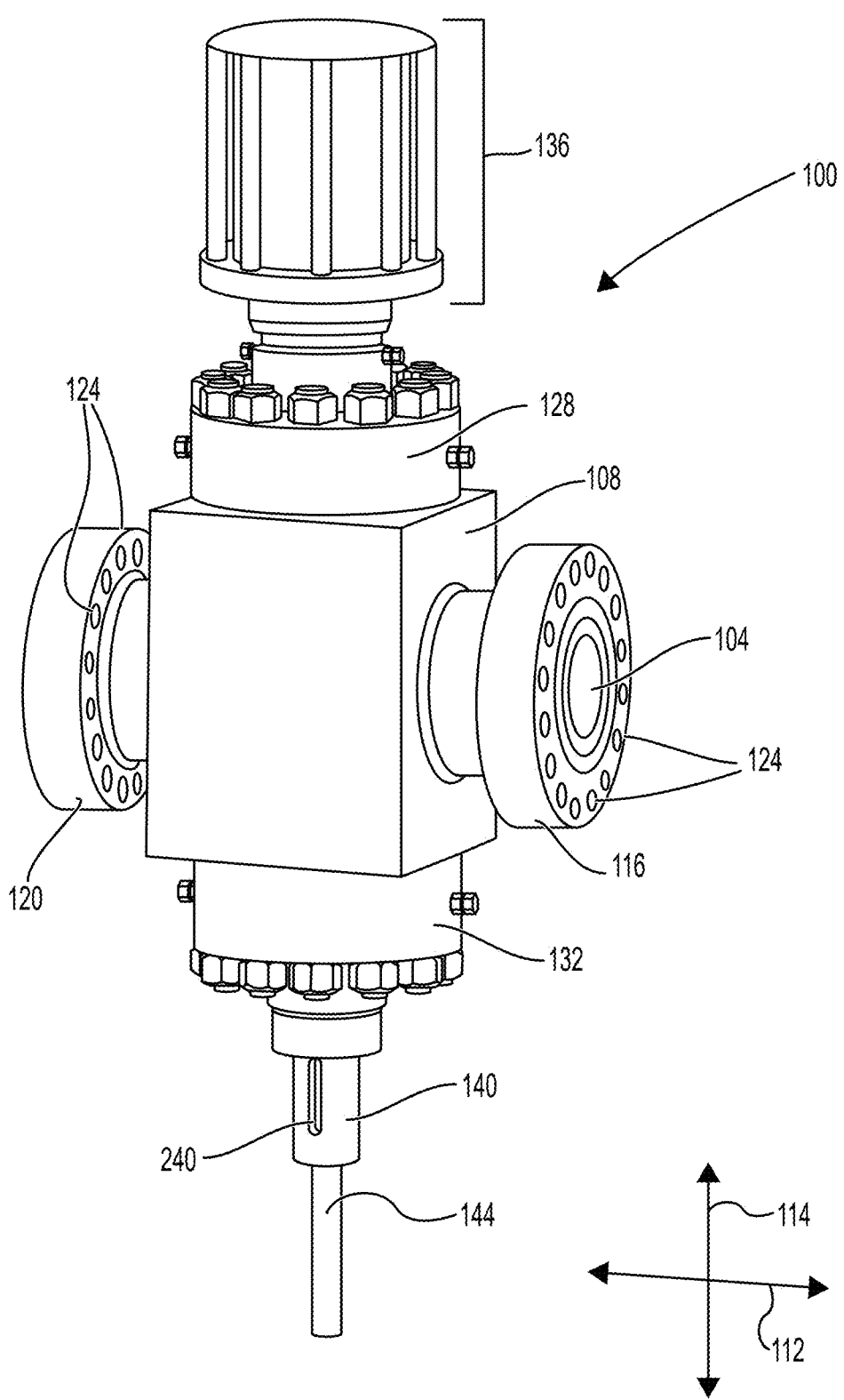
FIG. 1 is a schematic, perspective view of an illustrative embodiment of a slab gate valve with a gate valve position indicator.

In the following detailed description of the preferred embodiments, reference is made to the accompanying drawings that form a part hereof, and in which is shown, by way of illustration, specific embodiments in which the disclosure may be practiced. These embodiments are described in sufficient detail to enable those skilled in the art to practice the disclosure, and it is understood that other embodiments may be utilized, and that logical structural, mechanical, electrical, and chemical changes may be made without departing from the spirit or scope of the disclosure. To avoid detail not necessary to enable those skilled in the art to practice the disclosure, the description may omit certain information known to those skilled in the art. The following detailed description is, therefore, not to be taken in a limiting sense, and the scope of the present disclosure is defined only by the claims. Unless otherwise indicated, as used through-out this document, "or" does not require mutual exclusivity.

In one illustrative embodiment, a gate valve has a valve body with a through-bore running the length of the gate valve. The through-bore being, typically, of circular cross section. The ends of the gate valve are connected to upstream and downstream tubulars, with fluid entering the gate valve from the upstream side and exiting the gate valve from the downstream side.

Flow is opened or closed by a gate within the gate valve. The gate is generally a slab with an opening in one area and a solid surface in another area. The gate resides within a gate cavity which bisects the through-bore and is able to be moved from an open position, in which the opening of the gate is in line with the through-bore, and a closed position, in which the solid surface of the gate blocks flow through the through-bore. In some applications, the gate valve may take a plurality of intermediate positions and constrain flow as a throttle valve.

The gate valve includes one or more gate position indicators. In one illustrative embodiment, a potentiometer serves as a gate position indicator. A balance rod having a first end and a second end is at least partially disposed within the gate cavity. The first end of the balance rod is coupled to the gate. The second end of the balance rod is coupled to a slider rod of a linear potentiometer. As the gate moves within the gate cavity between open and closed positions or any intermediate positions, the balance rod and the slider rod move along with the motion of the gate. Varying the position the slider rod within the potentiometer results in changes in the resistance of the potentiometer. The resistance of the potentiometer is correlated to the position of the gate so that the position of the gate is determined by the resistance of the potentiometer.

Alternatively or in addition, a visual gate position indicator is used to indicate the position of the gate within the gate cavity. A balance rod housing coupled to the valve body at least partially covers the balance rod within a cavity of the balance rod housing. A viewing aperture is formed within the balance rod housing so that at least a portion of the balance rod is visible through the viewing aperture. Since the balance rod is coupled to the gate and moves along the length of the gate cavity with the gate, the position of the gate is correlated to the visible portion of the balance rod that can be seen through the viewing window. In some embodiments, the viewing window is covered with a debris shield.

Figure 2:
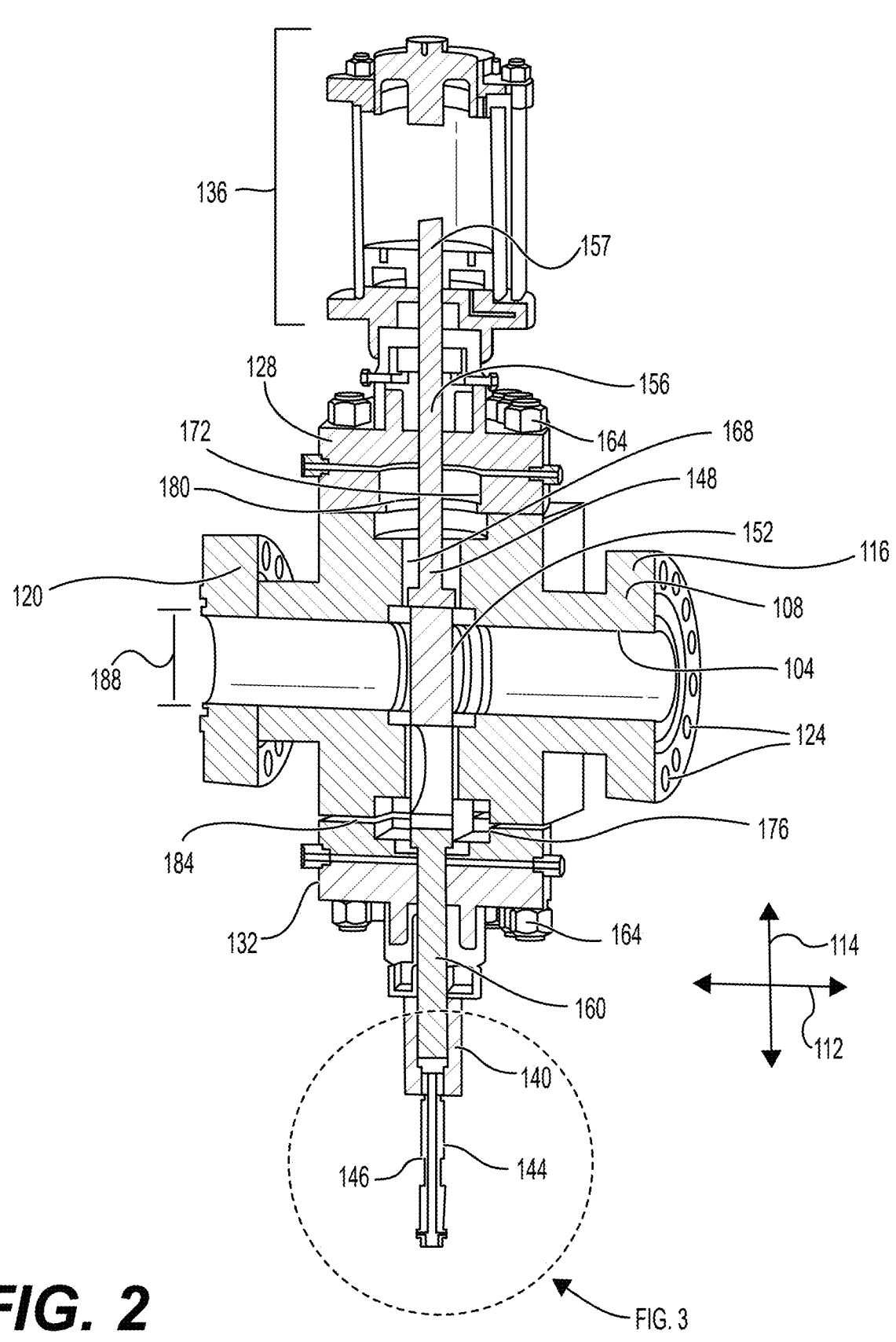
FIG. 2 is a schematic, perspective view with a portion shown in cross section of the illustrative embodiment of the slab gate valve of FIG. 1.

Referring now to the figures and primarily to FIGS. 1-2, and initially to FIG. 1, an illustrative embodiment of a slab gate valve 100 is presented. The slab gate valve 100 has a through-bore 104, which is a circular bore through the length of a valve body 108, for allowing a fluid flow therethrough as desired. The through-bore 104 is oriented along the length of the valve body 108 in a first direction 112. The slab gate valve 100 may be coupled to pipes or other tubings, through which fluid may flow in the first direction 112, with a first flange 116 and a second flange 120. A pipe or other tubing is connected to the first flange 116 and the second flange 120 with bolts or studs using a plurality of bolt holes 124, so that fluid may flow through the through-bore 104 in the first direction 112. A studded connection may also be used to attach pipes or other tubing to the first flange 116 and the second flange 120. Those skilled in the art will appreciate that other coupling devices and methods may be used. It should be noted that the slab gate valve 100 may be bi-directional, but for convenience, is presented with flow in a single direction.

An upper bonnet 128 and a lower bonnet 132 are coupled to the valve body 108. All relative directions, e.g., "upper" and "lower," are for the orientation shown in the figures. An operator assembly 136 is coupled to the upper bonnet 128. The operator assembly 136 of FIGS. 1 and 2 is a hydraulically operated operator assembly 136. It will be appreciated by those skilled in the art that other types of operator assemblies 136 may be used instead of a hydraulically operated operator assembly 136, such as a manually operated or a pneumatically operated operator assembly 136. The operator assembly 136 may be actuated to change the gate valve 100 from the open position to the closed position and vice versa.

Figure 3:
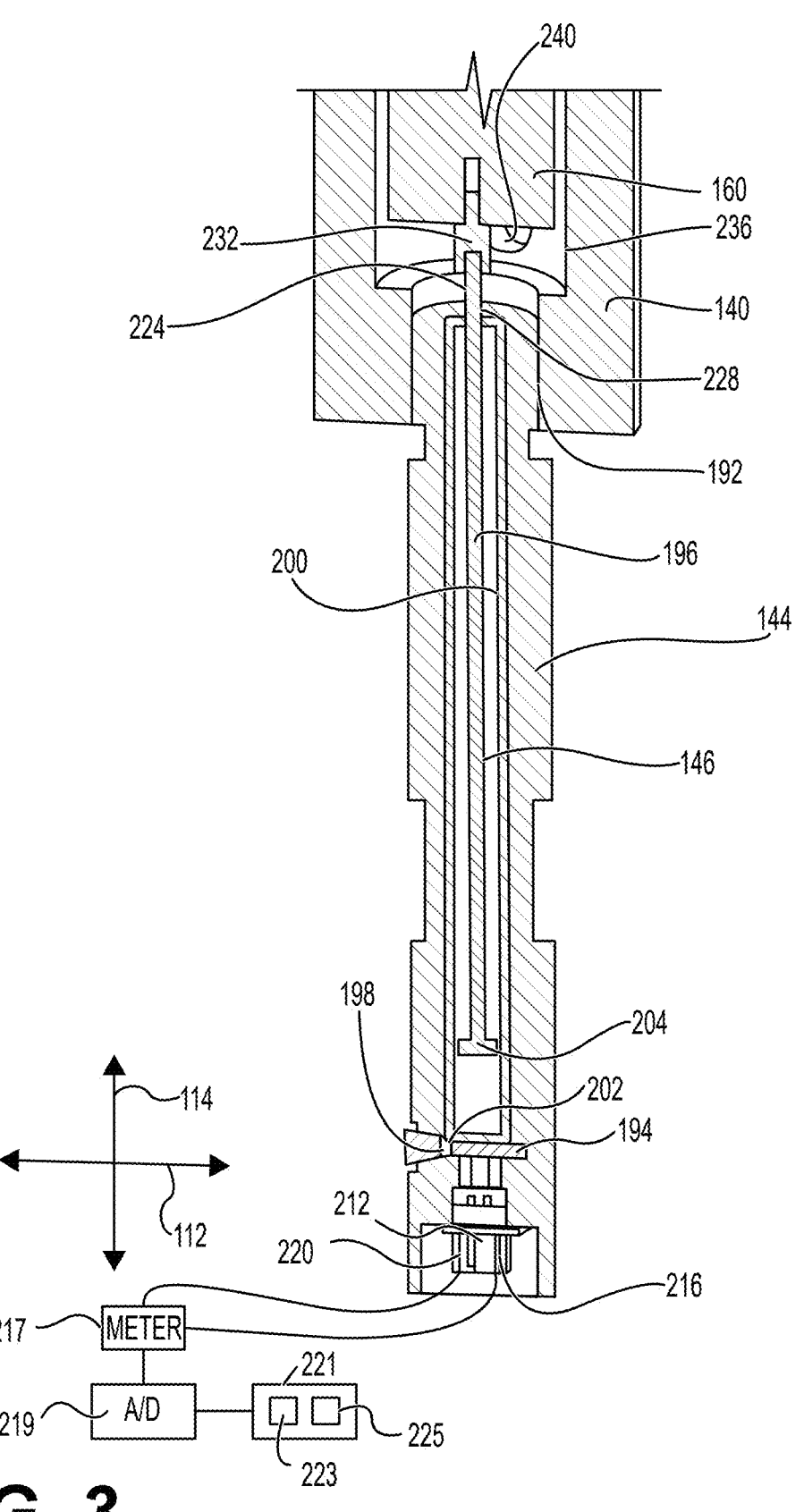
FIG. 3 is a schematic, detailed perspective view, with a portion shown in cross section, of a portion of the illustrative embodiment of the slab gate valve of FIG. 1.

A balance rod housing 140 is coupled to the lower bonnet 132. A potentiometer housing 144 is coupled to the balance rod housing 140. In some embodiments, the potentiometer housing 144 is press fit in a lower aperture of balance rod housing 192 (FIG. 3). In other embodiments, the potentiometer housing 144 may be coupled to the balance rod housing 140 by other means, such as a threaded connection, with bolts and nuts, or with studs.

In other embodiments the lower bonnet 132 is not used and the balance rod housing 140 is coupled to the valve body 108. In other embodiments, a balance rod housing 140 is not used and the potentiometer housing 144 is coupled to the valve body 108. A potentiometer 146 (FIGS. 2 and 3) is inserted into and coupled to the potentiometer housing 144.

Referring now primarily to FIG. 2, the upper bonnet 128 and the lower bonnet 132 are located on an upper side and a lower side, respectively, of the valve body 108. The upper bonnet 128 and the lower bonnet 132 are used to attach and contain a portion of a gate assembly 148 within the valve body 108. The gate assembly 148 includes a gate 152, an upper stem 156, and a balance rod 160. The upper bonnet 128 and the lower bonnet 132 are coupled to the valve body 108 with a plurality of studs or bolts 164. The upper stem 156 and the balance rod 160 extend from the centers of the upper and lower ends of the upper bonnet 128 and the lower bonnet 132, respectively. The upper end 157 of the upper stem 156 is coupled to the operator assembly 136. The operator assembly 136 is used to actuate the gate assembly 148 between an open and closed position and any desired intermediate positions. The operator assembly 136 of the slab gate valve 100 is a hydraulic operator. In other embodiments, the operator assembly 136 is a manual or electrical operator or other suitable type of operator.

A gate cavity 168 is a cavity within the valve body 108 that is oriented substantially in a second direction 114 (vertical for the orientation shown) and that is substantially perpendicular to and transects the through-bore 104. The gate cavity 168 is sized and configured to receive the gate assembly 148. An upstroke lubricant cavity 172 and a downstroke lubricant cavity 176 are partially formed by cutouts from the valve body 108 at the upper and lower ends of the gate cavity 168, respectively. The upstroke lubricant cavity 172 and the downstroke lubricant cavity 176 are also partially formed by cutouts within the upper bonnet 128 and the lower bonnet 132, respectively. When the upper bonnet 128 and the lower bonnet 132 are assembled onto the valve body 108, the cutouts within the upper bonnet 128 and the valve body 108 and the cutouts within the lower bonnet 132 and the valve body 108 align to form the upstroke lubricant cavity 172 and the downstroke lubricant cavity 176, respectively. The connection between the upper bonnet 128 and the valve body 108 is sealed from fluid flow by an upper bonnet gasket 180. Likewise, the connection between the lower bonnet 132 and the valve body 108 is sealed from fluid flow by a lower bonnet gasket 184. The lower bonnet gasket 184 and the upper bonnet gasket 180 are made from suitable gasket material, such as any compressible material, for example any of the NBR type rubbers, or metallic material, for example 316 Stainless Steel.

The through-bore 104 has a diameter 188, which is of sufficient size to allow for the desired flow through slab gate valve 100. In one embodiment the diameter 188 is in the range of 1¹³⁄₁₆″ thru 7¹⁄₁₆″. Those skilled in the art will appreciate that other sizes may be used.

Referring now primarily to FIG. 3, a detailed view of a portion of a slab gate valve 100 with multiple gate position indicators is depicted. The potentiometer housing 144 is coupled to the balance rod housing 140. The potentiometer housing 144 is at least partially disposed within a lower aperture 192 of the balance rod housing 140. The potentiometer housing 144 may be coupled to the balance rod housing 140 with a threaded or a press fit connection or may be coupled by fasteners or other methods. The potentiometer 146 is at least partially disposed within and coupled to the potentiometer housing 144. In some embodiments, the potentiometer 146 is retained within and coupled to the potentiometer housing 144 by a pin 194 inserted into and disposed within an aperture 202. In some embodiments the pin 194 is captured within the aperture 202 by a plug 198. In some embodiments, the plug 198 is disposed within the aperture 202 and is retained within the aperture 202 by a threaded connection.

The potentiometer 146 includes a slider rod 196 partially disposed within a slider cavity 200 of the potentiometer 146. A lower end 204 (or second end) of the slider rod 196 electrically contacts the inner wall of the potentiometer 146 or other components to complete an electrical circuit. The slider rod 196 is capable of moving along the second direction 114 through the slider cavity 200. The slider rod 196 is electronically coupled to an electrical connector 212. The electrical connector 212 is capable of applying a voltage input at a first terminal 216 and of receiving a voltage output at a second terminal 220. The received voltage is reduced relative to the applied voltage relative to the overall electrical resistance of the potentiometer 146.

The overall resistance electrical resistance between the first terminal 216 and the second terminal 220 is determined by the location of the slider rod 196 within the slider cavity 200 along the second direction 114 because the contact point between the lower end 204 of the slider rod 196 changes with movement of the slider rod 196 in the second direction 114. This results in varied overall electrical resistance between the first terminal 216 and the second terminal 220 because the length of the completed electrical circuit varies based on the position of the slider rod 196 along the second direction 114.

The overall electrical resistance between the first terminal 216 and the second terminal 220 can, therefore, be correlated to the relative position of the slider rod 196 along the second direction 114.

An upper end 224 of the slider rod 196 extends out of the potentiometer housing 144 through a slider rod aperture 228 and is coupled to an adapter 232 by a threaded connection. The adapter 232 is coupled to the balance rod 160 through a threaded connection or other coupler, e.g. fasteners. In other embodiments the slider rod 196 is directly coupled to the balance rod 160 and the adapter 232 is not used. The balance rod 160 is at least partially disposed within a housing cavity 236 of the balance rod housing 140.

As the gate 152 (FIG. 2) is moved from the open position to the closed position, the gate 152, and therefore, the gate assembly 148, travels along the second direction 114. Since the balance rod 160 is part of the gate assembly 148, the balance rod 148 also moves along the second direction 114 the same distance that the gate 152 moves in the second direction 114. In addition, since the slider rod 196 is coupled to the balance rod 160, the slider rod 196 also moves the same distance that the gate 152 moves in the second direction 114. The resulting movement of the slider rod 196 along the second direction 114 causes a change in the overall electrical resistance between the first terminal 216 and the second terminal 220.

The resulting differences in electrical resistance between the first terminal 216 and the second terminal 220 can be correlated to the position of the gate 152. In this manner, the potentiometer 146 is used to indicate the position of the gate 152 along the second direction 114. In one embodiment, the potentiometer 146 as described herein is used to indicate the position of the gate 152 within the slab gate valve 100. An electrical current with a first voltage is applied to the first terminal 216 of the potentiometer 146. The electrical current is received from the second terminal 220 of the potentiometer 146 with a second voltage. The difference between the first voltage and the second voltage is then determined. The difference between the first voltage and the second voltage is correlated with the position of the gate 152 within the slab gate valve 100.

The potentiometer 146 may be used to develop an electronic indication of the gate position and that may be connected to a digital signal. The digital signal may be used to monitor the gate valve 100 and may be used with an automated operator assembly 136 to adjust the gate 156 position remotely. The potentiometer 146 and the electrical indication of the gate position may be used to determine if the gate valve 100 is operating fully opened or fully closed and may be used to determine the closing or opening speed of the valve.

Referring still to FIG. 3, in some embodiments, the first terminal 216 and the second terminal 220 may be electrically coupled to an ohmmeter 217 that may produce an analog measure of resistance or analog resistance signal based on the position of the slider rod 196 and, therefore, the position of the gate 152 along the second direction 114. The ohmmeter 217 may be electrically couped to an analog-to-digital convertor 219 that produces a digital resistance signal that is provided to a computer 221 having at least one microprocessor 223 and at least one associated non-volatile memory 225. The computer 221 may be programmed to produce a position indication from the digital resistance signal using previously stored correlation data.

In some embodiments, the position of the gate 152 along the second direction 114 is determined by correlating the output of the potentiometer 146 to previously determined outputs. For example, a known voltage may be applied to the electrical circuit at the first terminal 216 while the gate valve 100 is known to be in the fully opened position. The detected output voltage at the second terminal 220 is then correlated to the gate 152 being in the fully opened position when the known voltage is applied to the first terminal 216. Analogously, the known voltage may be applied to the first terminal 216 while the gate valve 100 is known to be in the fully closed position, and the output voltage detected at the second terminal is then correlated to the gate 152 being in the fully closed position. The output voltage of the second terminal 220 may likewise be correlated with any position of the gate 152 along the second direction 114.

While in use, the ohmmeter 217, analog-to-digital convertor 219, and computer 221 may be used in conjunction with known outputs at the second terminal 220 based on known input voltages of the first terminal 216. In some embodiments, computer instructions are stored within the non-volatile memory 225 of the computer 221, and the at least one microprocessor 223 executes the computer instructions to correlate detected outputs of the second terminal 220 to known outputs of the second terminal 220 at known gate 152 positions along the second direction 114.

Figure 4:
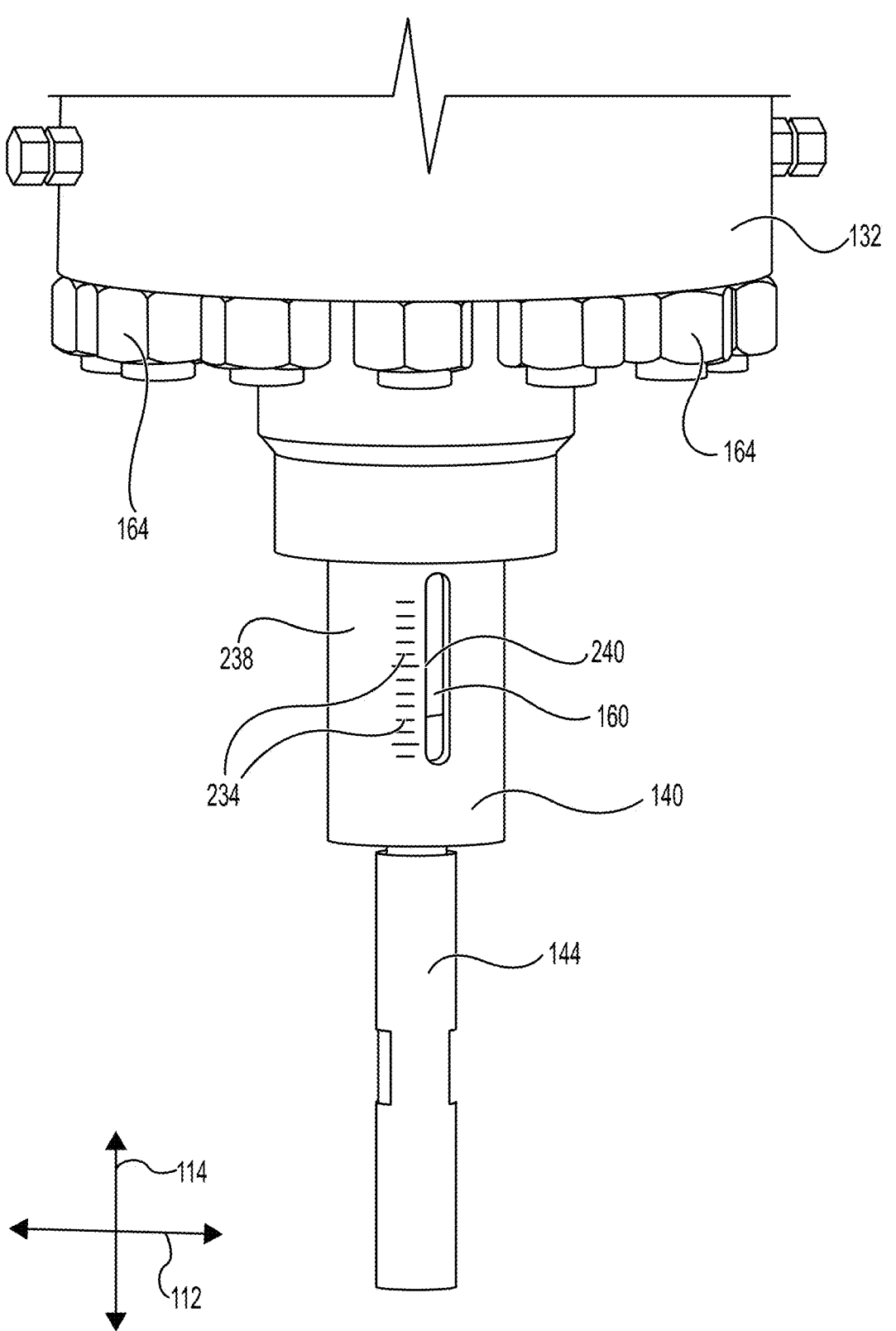
FIG. 4 is a schematic, detailed perspective view of a portion of the illustrative embodiment of the slab gate valve of FIG. 1.

Referring now primarily to FIG. 4, another gate position indicator is discussed. As discussed above, the balance rod housing 140 is coupled to the lower bonnet 132 and the balance rod 160 is at least partially disposed within the housing cavity 236 (FIG. 3). A viewing aperture 240 is formed within the balance rod housing 140. The balance rod 160 is visible through the viewing aperture 240. Since the position of the balance rod 160 along the second direction 114 can be correlated to the position of the gate 152 along the second direction 114, the viewing aperture also serves as a gate position indicator. An operator can determine the position of the gate 152 along the second direction 114 by looking at the balance rod 160 through the viewing aperture 240 and correlating the position of the balance rod 160 along the second direction 114 with the position of the gate 152 along the second direction 114. This information may be used to calibrate the measurements provided by the potentiometer 146.

In some embodiments, a plurality of position indicator marks 234 may be made on an exterior surface 238 of the balance rod housing 140 proximate to the viewing aperture 240 to indicate the relative position of the balance rod housing 140 along the second direction 114. In some embodiments, the balance rod 160 may have analogous position indicator marks 234 to that line up with the position indicator marks 234 on the exterior of the balance rod housing 140 when the balance rod 160 is in a predetermined position along the second direction 114. For example, the balance rod 160 and the exterior of the balance rod housing 140 may each have a position indicator marks 234 and alignment of those position indicator marks 234 may indicate that the gate valve 100 is fully opened or is fully closed. In some embodiments, the balance rod 160 color indicators to indicate the position of the gate 152. For example, when the gate 152 is fully closed a red portion of the balance rod 160 may be visible through the viewing aperture 240, and, when the gate 152 is fully opened a green portion of the balance rod 160 may be visible through the viewing aperture 240.

Figure 5:
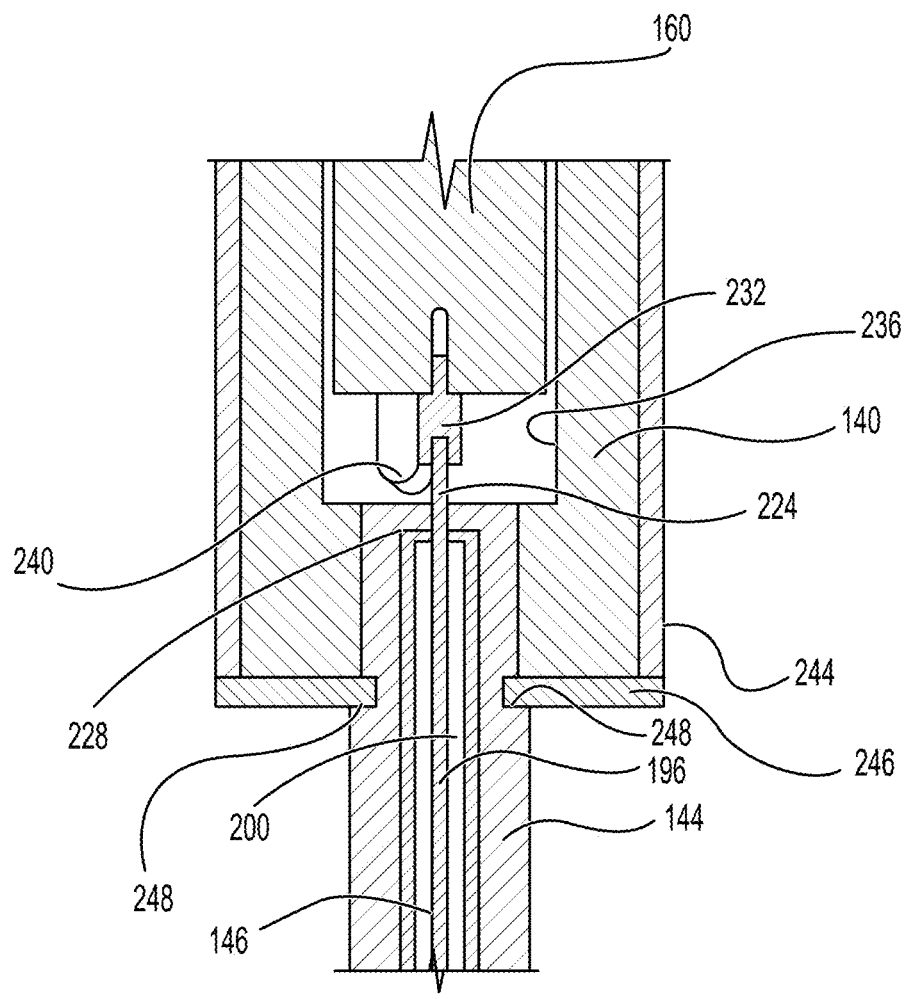
FIG. 5 is a schematic, detailed cross sectional view of the illustrative embodiment of the slab gate valve of FIG. 1 with a debris shield.
Figure 6:
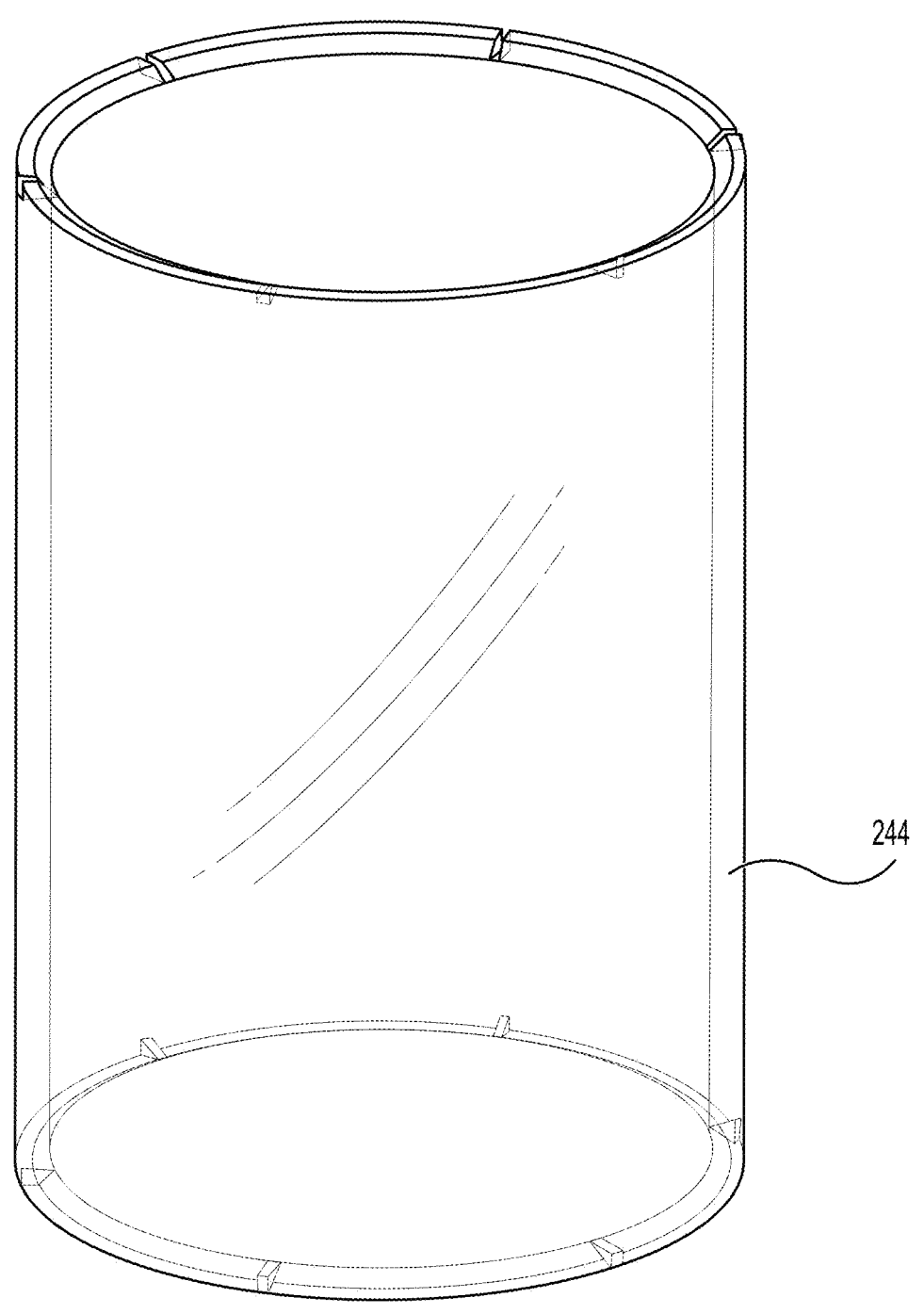
FIG. 6 is a schematic, perspective view of an illustrative embodiment of a debris shield for the slab gate valve of FIG. 1.

Referring now primarily to FIGS. 5 and 6, a debris shield 244 for the viewing aperture 240 is discussed. The debris shield 244 is sized and shaped to slide over the exterior of the balance rod housing 140 and to cover the viewing aperture 240. The debris shield 244 is made from a transparent or translucent material, such as a suitable plastic or polymer, so as not to prevent the viewing of the position of the balance rod 160 when viewing the balance rod 160 through the viewing aperture 240. In this manner, the debris shield 244 prevents debris, particles, or other contaminates from entering into the housing cavity 236, which may interfere with operation of the slab gate valve 100. In some embodiments, the debris shield 244 is retained in place by a ring or washer 246. The ring or washer 246 is at least partially disposed on and retained by a ridge 248 of the potentiometer housing 144.

In some embodiments of the slab gate valve 100, the position of the gate 152 is indicated by the potentiometer 146 and the viewing aperture 240 and debris shield 244 are not used. In some embodiments of the slab gate valve 100, the position of the gate 152 is indicated by the viewing aperture 240 with or without the debris shield 244 and the potentiometer 146 is not used. In other embodiments, both the potentiometer 146 and the viewing aperture 240, with or without the debris shield 244, are both used to indicate the position of the gate 152.

In one embodiment, an illustrative method for determining the position of the gate 152 within the gate valve 100 includes the steps of applying an electrical current to a first terminal of a potentiometer, wherein the electrical current has a first voltage; receiving the electrical current from a second terminal of a potentiometer, wherein the electrical current has a second voltage; determining the difference between the first voltage and the second voltage using an ohmmeter; and correlating the difference between the first voltage and the second voltage with a position of a slab gate within a gate valve.

In one embodiment the illustrative method for determining the position of the gate 152 within the gate valve 100 further includes the steps of transmitting an analog resistance signal from the ohmmeter to a digital-to-analog convertor; converting the analog resistance signal to a digital resistance signal using the digital-to-analog convertor; transmitting the digital resistance signal from the digital-to-analog convertor to a computer having at least one processor and at least one non-volatile memory; and using the processor to execute computer program instructions stored on the non-volatile memory to perform the step of correlating the difference between the first voltage and the second voltage with the position of slab gate within the gate valve. In some embodiments, the processor uses correlation data to perform the step of correlating the difference between the first voltage and the second voltage with the position of slab gate within the gate valve There are many examples of the various embodiments described herein. A number of examples also follow:

Example 1. A gate valve comprising:
a valve body, wherein the valve body is formed with a through-bore therethrough and a gate cavity and wherein the through-bore and the gate cavity intersect and are substantially orthogonal to each other;
a gate disposed within the gate cavity, wherein the gate is operable to translate along a length of the gate cavity to move between an open position and a closed position, wherein when the gate is in the closed position the gate substantially blocks fluid flow through the through-bore and when the gate is in the open position the gate does not substantially block fluid flow through the through-bore;
a balance rod having a first end and a second end, wherein the first end of the balance rod is coupled the gate and wherein the balance rod is at least partially disposed within the gate cavity; and a potentiometer coupled to the second end of the balance rod for determining gate position.

Example 2. The gate valve of example 1, further comprising: a balance rod housing coupled to the valve body;
wherein the balance rod is at least partially disposed within the balance rod housing; and
wherein the balance rod housing is formed with a viewing aperture through which the position of the balance rod can be determined.

Example 3. A method for indicating the position of a slab gate within a gate valve comprising the steps of:
applying an electrical current to a first terminal of a potentiometer, wherein the electrical current has a first voltage;

receiving the electrical current from a second terminal of a potentiometer, wherein the electrical current has a second voltage;

determining the difference between the first voltage and the second voltage;

correlating the difference between the first voltage and the second voltage with the position of the slab gate within the gate valve;

wherein the potentiometer is coupled to a valve body of the gate valve;

wherein a slider rod of the potentiometer is coupled to a balance rod of the gate valve; and wherein the balance rod of the gate valve is coupled to the slab gate.

Example 4. A gate valve system comprising:

A gate valve as described in Example 1;

wherein the potentiometer has a first terminal and a second terminal;

an ohmmeter electrically coupled to the first terminal and the second terminal and operable to produce an analog resistance signal;

an analog-to-digital convertor electrically coupled to the ohmmeter for receiving the analog resistance signal and producing a digital resistance signal; and a microprocessor and associated non-volatile memory for receiving the digital resistance signal and producing a position signal based on correlation data between the gate position and resistance signal.

Although the present disclosure and its advantages have been disclosed in the context of certain illustrative, non-limiting embodiments, it should be understood that various changes, substitutions, permutations, and alterations can be made without departing from the scope of the disclosure as defined by the claims. It will be appreciated that any feature that is described in a connection to any one embodiment may also be applicable to any other embodiment.

What is claimed:

1. A method of indicating the position of a gate of a gate valve comprising the steps of:

applying an electrical current to a first terminal of a potentiometer, wherein the electrical current has a first voltage;

receiving the electrical current from a second terminal of a potentiometer, wherein the electrical current has a second voltage;

determining the difference between the first voltage and the second voltage using an ohmmeter;

correlating the difference between the first voltage and the second voltage with a position of a slab gate within a gate valve;

wherein the potentiometer is coupled to a valve body of the gate valve;

wherein a slider rod of the potentiometer is coupled to a balance rod of the gate valve; and wherein the balance rod of the gate valve is coupled to the slab gate.

2. The method of claim 1, further comprising the steps of:

transmitting an analog resistance signal from the ohmmeter to a digital-to-analog convertor;

converting the analog resistance signal to a digital resistance signal using the digital-to-analog convertor;

transmitting the digital resistance signal from the digital-to-analog convertor to a computer comprising at least one processor and at least one non-volatile memory; and wherein the at least one non-volatile memory contains computer instructions which, when executed by at least one processor, instruct the at least one processor to perform the step of correlating the difference between the first voltage and the second voltage with the position of slab gate within the gate valve.

3. The method of claim 2, wherein correlation data is stored on the at least one non-volatile memory; and the at least one processor utilizes the correlation data to perform the step of correlating the difference between the first voltage and the second voltage with the position of slab gate within the gate valve.

4. The method of claim 1, wherein the potentiometer is a linear potentiometer.

5. The method of claim 1, wherein the balance rod is at least partially disposed within a balance rod housing coupled to the valve body; and wherein the potentiometer is at least partially disposed within a potentiometer housing coupled to the balance rod housing.

* * * * *